Sept. 16, 1952     S. L. FULLER     2,611,046
VEHICLE TURN INDICATING SWITCH
Filed Aug. 31, 1949
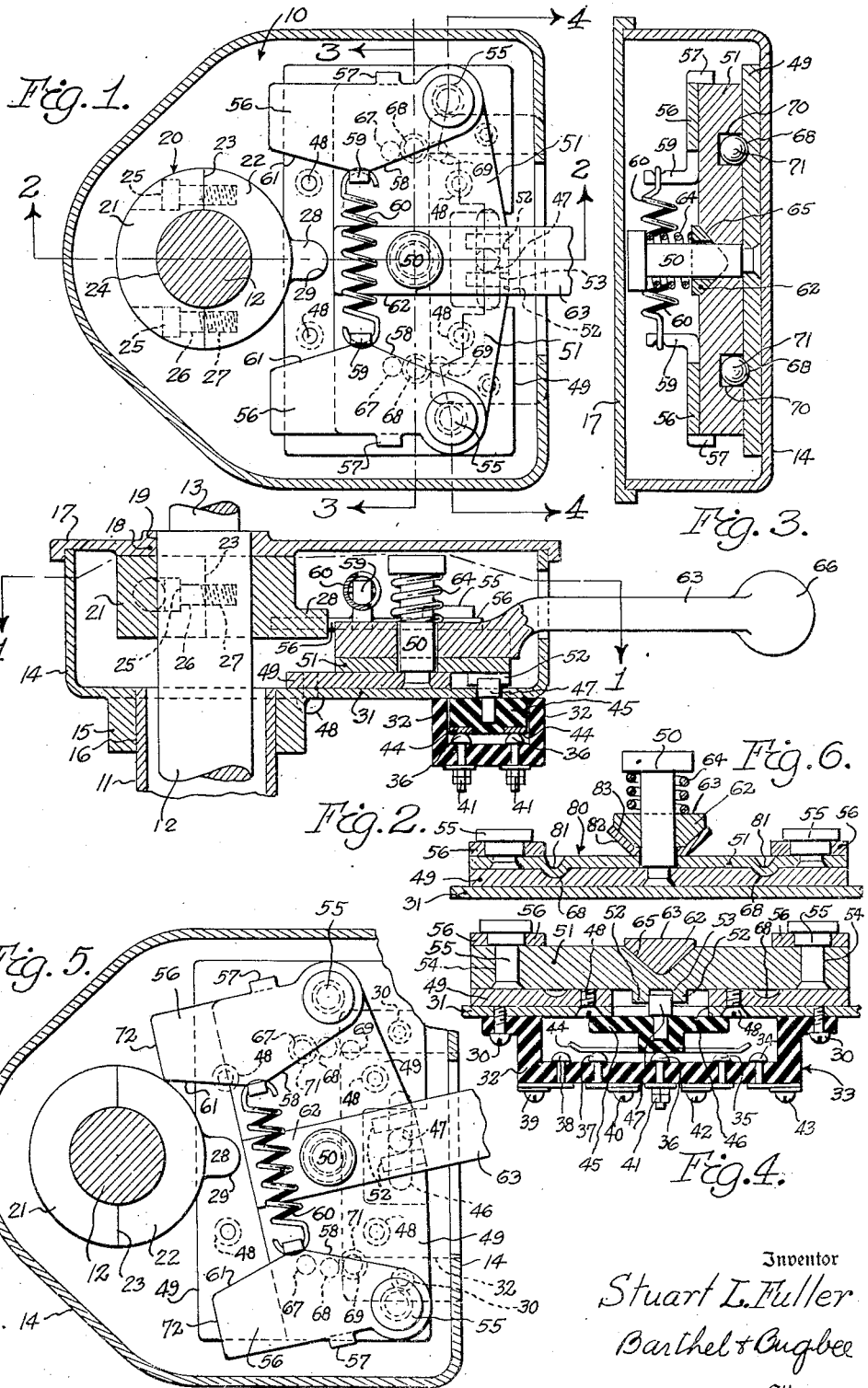
Inventor
Stuart L. Fuller
Barthel & Bugbee
Attorneys Patented Sept. 16, 1952

2,611,046

UNITED STATES PATENT OFFICE 2,611,046

VEHICLE TURN INDICATING SWITCH

Stuart L. Fuller, Royal Oak, Mich.

Application August 31, 1949, Serial No. 113,295

2 Claims. (Cl. 200—59)

This invention relates to motor vehicle turn indicators, and in particular, to control switches for such indicators.

One object of this invention is to provide a control switch of simplified construction for a motor vehicle turn indicator which will yieldably and releasably hold the switch arm in its shifted position indicating a right-hand or left-hand turn, but which immediately shifts the switch arm back to its off position in response to the reverse rotation of the steering wheel which brings the vehicle back into its straight-line path after making the turn.

Another object is to provide a control switch of the foregoing character which has a minimum number of moving parts yet which is of sufficiently durable construction to outlast the vehicle.

Another object is to provide a control switch of the foregoing character wherein the switch is held either in its off or on position by a detent mechanism of simple construction which prevents the switch from being operated by the jolting action of the vehicle.

In the drawings:

Figure 1 is a top plan view of a vehicle turn indicator switch in its neutral or off position, according to one form of the invention, with the cover removed and the casing and steering shaft in section along the line 1—1 in Figure 2;

Figure 2 is a central vertical section along the line 2—2 in Figure 1;

Figure 3 is a vertical cross-section along the line 3—3 in Figure 1;

Figure 4 is a vertical cross-section along the broken line 4—4 in Figure 1;

Figure 5 is a view similar to Figure 1, but with the control switch shifted into a position indicating a left turn; and Figure 6 is a view similar to Figure 3, but showing a slightly modified construction.

Referring to the drawings in detail, Figures 1 to 5 inclusive show a vehicle turn indicator switch, generally designated 10, adapted to be mounted upon the usual tubular steering post 11 of a vehicle. Mounted in the steering post 11 is the conventional steering shaft 12, the lower end of which is connected to the steering mechanism leading to the wheels of the vehicle, and the upper end of which is provided with a reduced diameter portion 13 upon which a conventional steering wheel (not shown) is mounted. The control switch 10 is contained within a casing 14 of cup-shaped form having a downwardly-extending tubular flange 15 which is bored as at 16 to receive the upper end of the steering post 11. The casing 14 is also provided with a flanged cover 17 having a thickened portion 18 which has a bore 19 for the passage of the steering wheel shaft 12.

Mounted on the steering wheel shaft 12 adjacent the cover 17 and within the casing 14 is an annular switch actuator, generally designated 20, having opposing halves 21 and 22 split along the line 23 and having a bore 24 receiving the steering wheel shaft 12. The halves 21 and 22 are clamped together and to the steering wheel shaft 12 by clamping screws 25 passing through countersunk holes 26 in the half 21 and threaded into threaded holes 27 in the half 22 (Figure 1). The switch actuator 20 is provided with a projection or lug 28 having a rounded end 29 and projecting radially from the actuator, which is in the form of a split column. If desired, a roller may be mounted on the projection 28 to reduce friction, but the latter is shown without the roller for the sake of simplicity.

Secured as by the fasteners 30 (Figure 4) to the bottom wall 31 of the casing 14 is the cup-shaped housing 32 of a conventional circuit-breaker or switch unit, generally designated 33 and bored to receive five pairs of contacts 34 to 38 inclusive connected respectively to pairs of binding screws or binding posts 39 to 43 inclusive. The contacts 34 to 38 inclusive are yieldingly engaged by a pair of spaced spring switch blades 44 (Figure 2) with upturned ends and with their central portions mounted on a slidable or slider member 45 slidingly engageable with the lower surface of the casing bottom wall 31. Seated in the central portion of the member 45 and extending upwardly through an elongated slot 46 in the casing bottom wall 31 (Figure 4) is a pin 47 which, when moved to and fro, slides the slider 45 to the right or left, bringing the switch blades 44 into positions interconnecting the central switch contacts with their right-hand or left-hand pairs of contacts 34, 35 or 37, 38 connected to the central pair of contacts 36.

Secured as by the fasteners 48 to the casing bottom wall 31 is a base plate 49 bored to receive an upstanding headed pivot pin 50. Loosely and pivotally mounted on the pivot pin 50 with a relatively great clearance therebetween is a switch-resetting member consisting of a movable plate 51 having spaced downwardly extending ridges 52 providing an elongated notch 53 therebetween for slidably receiving the upper end of the pin 47. The opposite ends of the plate 51 are bored as at 54 to receive headed pivot pins 55 carrying pivoted dogs or detent arms 56. The arms 56 on their outer sides are provided with downwardly extending stop lugs 57 which engage the opposite sides of the plate 51 and limit the inward moving of the arms or dogs 56 around the pivot pins 55. The inner sides 58 of the arms or dogs 56 are provided with upstanding lugs 59 (Figure 3) to which are attached the opposite ends of a tension spring 60 which constantly urges the arms 56 toward one another until the stop lugs 57 engage the opposite sides of the plate 51. The inner sides 58 are angled as at 61 near their forward ends for engagement with the rounded end 29 of the projection 28 on the actuator 20 (Figure 1).

Also loosely and pivotally mounted on the pivot pin 50 and superimposed upon the movable plate 51 is the inner end portion 62 of a manual operating member consisting of a hand lever 63. The lower side of the hand lever portion 62 is of V-shaped cross-section (Figure 4) and engages a corresponding V-shaped notch or groove 65 in the upper surface of the plate 51. A compression coil spring 64 constantly urges the hand lever portion 62 downward against the plate 51 and into the notch 65. The V-shaped hand lever portion 62, the V-shaped notch 65 and the coil spring 64 collectively form a yielding strain-relief connection disposed between the hand lever 63 and the movable flight 51. The outer end of the hand lever 63 is provided with a knob 66 adapted to be grasped by the operator.

In order to yieldably hold the movable plate 51 in each of its three positions, the base plate 49 is provided with three partially spherical recesses 67, 68 and 69, the centers of which are located at equal radii from the axis of the pivot pin 50 (Figures 1 and 3). The bottom surface of the plate 51 is provided with diametrically opposite sockets 70 arranged at the same radii and containing balls 71 adapted to enter the recesses 67, 68 and 69. The switch 10 is connected into a conventional vehicle turn direction indicator circuit, such as is well known to automotive engineers. Such a circuit, for example, is shown in my co-pending application, Serial No. 85,853 filed April 6, 1949 for "Vehicle Turn Signalling Switch," and its details form no part of the present invention.

In the operation of the invention, the parts of the control switch 10 normally occupy the neutral positions shown in Figures 1 to 4 inclusive. When it is desired to make a right-hand or left-hand turn of the vehicle, the operator grasps the knob 66 and shifts the hand lever 63 in the direction in which the steering wheel will be rotated in order to execute such a turn. Let it be assumed that the operator desires to indicate that he is about to make a left-hand turn, whereupon he shifts the hand lever 63 to the right or in a counterclockwise direction (Figure 5), that is, in the same direction in which he must rotate the steering wheel in order to execute the turn.

The shifting of the hand lever 63 to the right into the left turn indicating position (Figure 5) causes the plate 51 to be rotated in a counterclockwise direction by reason of the connection therebetween resulting from the engagement of the hand lever portion 62 with the notch 65. When this occurs, the slider 45 is shifted to the right by the engagement of the plate groove 53 with the pin 47 (Figure 4), causing the switch blades 44 to bridge the pairs of contacts 34, 35 and 36. For daytime driving, this in turn causes the vehicle battery to be connected to the left-hand tail light or turn indicating light, with or without a flasher which causes the signal light to go off and on intermittently, while the right-hand tail light remains dark or unlighted. When the operator rotates the steering wheel and shaft 12 in a counterclockwise direction to execute the left-hand turn which he is signalling, the projection 28 is rotated into engagement with the angled portion 61 of the right-hand dog or arm 56 (Figure 4), causing the arm 56 to move outward so as to permit the projection 28 to pass. Consequently, the signal light or left-hand tail light continues to flash or be illuminated while the operator is making the left-hand turn.

The yielding connection between the hand lever 63 and the movable plate 51 is merely for the purpose of preventing breakage of the hand lever 63 or other parts in the event that the operator accidentally hits the hand lever 63 in such a manner as would otherwise tend to push it beyond its extreme position. If such an accident occurs, the V-shaped portion 62 of the hand lever 63 merely jumps out of the notch 65 (Figures 2 and 4), compressing the spring 64, but otherwise permitting the hand lever 63 to swing past its normal position. When it is swung in the opposite direction, the V-shaped portion 62 snaps back into the notch 65 and a mechanical connection is re-established between the hand lever 63 and the movable blade 51.

After the vehicle has made the left-hand turn, the operator rotates the steering wheel in a counterclockwise direction to bring the vehicle wheels back to a straight line path. In so doing, he swings the projection 28 in a clockwise direction against the outer end 72 of the right-hand arm 56, pushing the latter backward and swinging the plate 51 in a clockwise direction around the pivot pin 50 into its Figure 1 position. Meanwhile, the detent ball 71 slips into and out of the central recesses 68 and the diametrically opposed recesses 67, 69. At the same time, the switch slider 45 is shifted back to its neutral position (Figure 4), disconnecting the outer switch contact 34 from the switch blades 44 and deenergizing the left-hand signal light or the flasher circuit of the left-hand tail light, as the case may be.

To indicate a right-hand turn, the operator swings the hand lever 63 to the left in the direction in which he would turn the steering wheel to execute a right-hand turn. This shifts the plate 51 to the left, bringing the left-hand arm or dog 56 into the path of the projection 28, the positions of the parts being reversed from the positions shown in Figure 5. This action, however, is the same as that previously described, except that the projection 28 engages the end 72 of the left-hand dog or arm 56 as the steering wheel shaft 12 and projection 28 are swung in a counterclockwise direction to resume straight line travel.

In operating the control switch 10 at night, the action is the same, except that the tail lights remain constantly energized and illuminated through a circuit including the central contacts 36 and the inner contacts 35 and 37 bridged by the switch blades 44, the flasher circuit being inoperative, as explained in my above-mentioned co-pending application. When, however, the control switch is shifted in the manner previously described, one or the other of the outer pairs of contacts 34 or 38 is additionally bridged, energizing the flasher circuit to the tail light on the side to which the turn is to be made. The other tail light remains constantly lit, without flashing.

The modification, generally designated 80, shown in Figure 6 is generally similar to the control switch 10 shown in Figures 1 to 5 inclusive, except that the detent connections between the hand lever 63 and the movable plate 51 and between the movable plate 51 and the base plate 49 are slightly simplified to include stampings and reduce machining. For this purpose, the base plate 49 is provided with the same recesses 67, 68, 69 as before, but protuberances 81 are struck downward from the plate 51 (Figure 6) to yieldably enter the above-mentioned recesses. The portion 62 of the hand lever 63 is also made of truncated triangular cross-section rather than of pointed triangular cross-section, and enters a stamped member 82 of similar cross-section and having a correspondingly shaped recess 83. The operation of the modification of Figure 6 is the same as that of the form of the invention shown in Figures 1 to 5 inclusive, except for these slight differences in construction.

What I claim is:

1. A manually-set vehicle turn indicating switch which is automatically reset to neutral position by a switch actuator on the steering shaft, said switch comprising a switch support mounted adjacent said actuator, a switch-resetting member pivotally mounted on said support, a pair of spaced dogs pivotally mounted on said switch-resetting member and movable therewith into and out of the path of travel of said switch actuator, a manual operating member connected to said switch-resetting member, a circuit breaker having its movable element operatively connected to said switch-resetting member, and a strain-relief connection including an interengaging projection and depression operated through said operating member and said switch-resetting member, said projection being disposed upon one of said members and said depression being disposed in the other of said members, said strain-relief connection also including a resilient element urging said projection into yielding engagement with said depression.

2. A manually-set vehicle turn indicating switch which is automatically reset to neutral position by a switch actuator on the steering shaft, said switch comprising a switch support mounted adjacent said actuator, a switch-resetting member pivotally mounted on said support, a pair of spaced dogs pivotally mounted on said switch-resetting member and movable therewith into and out of the path of travel of said switch actuator, a manual operating member connected to said switch-resetting member, a circuit breaker having its movable element operatively connected to said switch-resetting member, and a strain-relief connection including an interengaging projection and depression of approximately V-shaped cross-section operated through said operating member and said switch-resetting member, said projection being disposed upon one of said members and said depression being disposed in the other of said members, said strain-relief connection also including a resilient element urging said projection into yielding engagement with said depression.

STUART L. FULLER.

REFERENCES CITED

The following references are of record in the file of this patent:

UNITED STATES PATENTS

| Number | Name | Date |
| --- | --- | --- |
| 1,165,159 | Dunner | Dec. 21, 1915 |
| 1,565,754 | Orth | Dec. 15, 1925 |
| 2,264,225 | Thirlwell | Nov. 25, 1941 |
| 2,284,936 | Wilshusen | June 2, 1942 |
| 2,299,876 | Breeze | Oct. 27, 1942 |
| 2,427,595 | Fuller | Sept. 16, 1947 |